United States Patent
Wolf et al.

(10) Patent No.: US 12,427,870 B2
(45) Date of Patent: Sep. 30, 2025

(54) METHODS AND SYSTEM FOR IMPROVING ELECTRIC MACHINE EFFICIENCY

(71) Applicant: Ford Global Technologies, LLC, Dearborn, MI (US)

(72) Inventors: Chris Wolf, Ann Arbor, MI (US); Michael Degner, Novi, MI (US); Yue Nie, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 18/163,682

(22) Filed: Feb. 2, 2023

(65) Prior Publication Data

US 2024/0262215 A1  Aug. 8, 2024

(51) Int. Cl.
*B60L 15/20* (2006.01)
*B60L 15/08* (2006.01)

(52) U.S. Cl.
CPC ........... *B60L 15/2045* (2013.01); *B60L 15/08* (2013.01); *B60L 2240/12* (2013.01); *B60L 2240/423* (2013.01); *B60L 2250/26* (2013.01); *B60L 2260/40* (2013.01)

(58) Field of Classification Search
None
See application file for complete search history.

(56) References Cited

U.S. PATENT DOCUMENTS

| | | | |
|---|---|---|---|
| 4,724,366 A | 2/1988 | Neesz | |
| 10,483,900 B2 | 11/2019 | Park et al. | |
| 10,944,352 B2 | 3/2021 | Mazda et al. | |
| 11,211,883 B2 | 12/2021 | Matsunobu et al. | |
| 11,345,241 B1 | 5/2022 | Cai | |
| 11,427,177 B2 * | 8/2022 | Serrano | H02P 27/16 |
| 11,628,730 B2 * | 4/2023 | Srinivasan | B60L 15/20 |
| | | | 701/22 |
| 2022/0294368 A1 | 9/2022 | Phillips et al. | |

FOREIGN PATENT DOCUMENTS

| | | |
|---|---|---|
| CN | 110313128 A | 10/2019 |
| CN | 114157213 A | 3/2022 |

* cited by examiner

*Primary Examiner* — Todd Melton
(74) *Attorney, Agent, or Firm* — David Kelley; McCoy Russell LLP

(57) ABSTRACT

Systems and methods for commanding an electric drive system for an electric or hybrid vehicle are described. In one example, the drive system is commanded by a controller that supplies a pulsed torque command that varies in frequency as a function of time when a driver of a vehicle requests a constant driver demand torque.

17 Claims, 11 Drawing Sheets

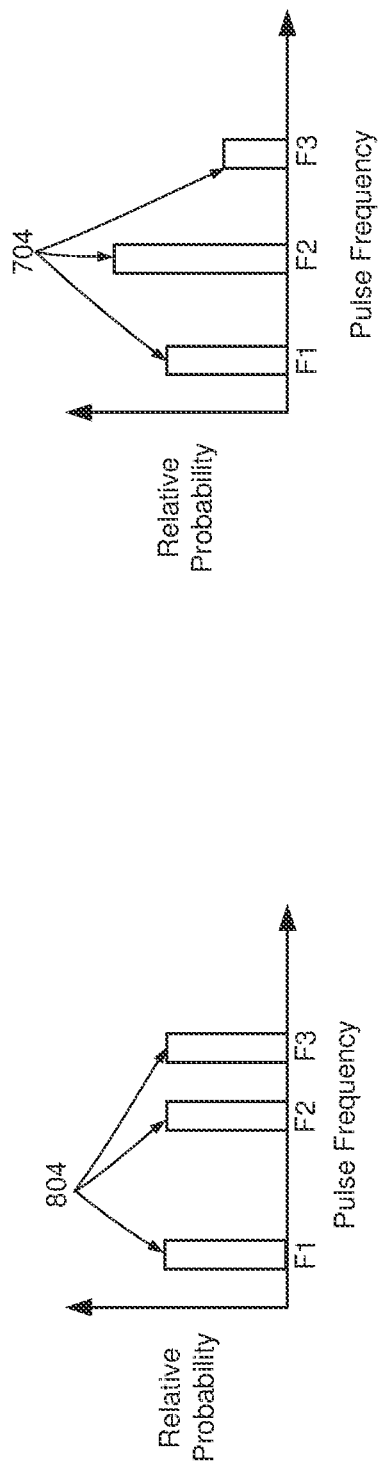

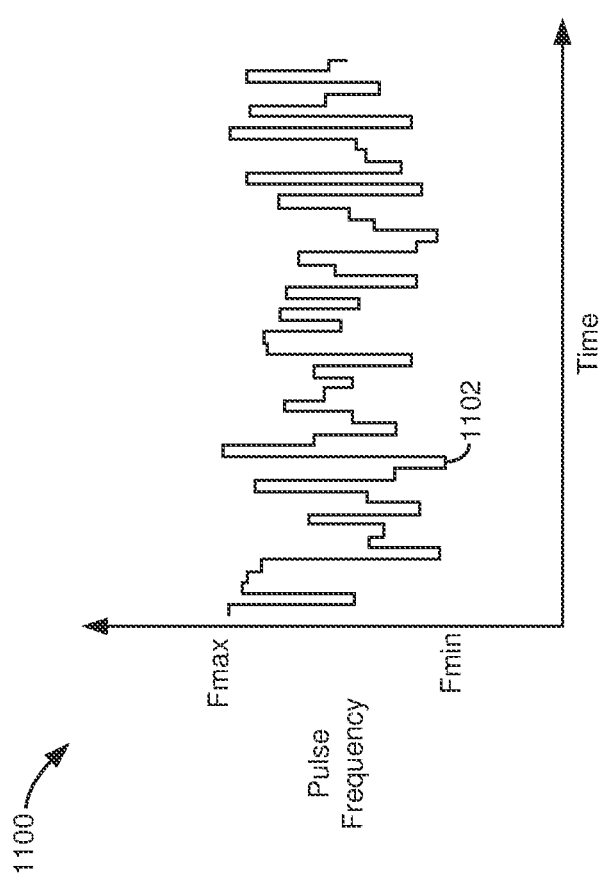

METHODS AND SYSTEM FOR IMPROVING ELECTRIC MACHINE EFFICIENCY

FIELD

The present description relates to methods and a system for operating an electric machine.

BACKGROUND

Losses of an electric machine may increase as torque generated by the electric machine increases. The electric machine losses may increase non-linearly as torque increases, but the electric machine losses may be greater at lower level electric machine torque output levels than may be expected due to inverter switching. Electric machines that operate in electric vehicles to provide propulsive effort may often operate at lower torque output levels. In addition, it may be desirable to convert electrical energy into propulsive force as efficiently as possible so that vehicle range may be extended and vehicle operating expenses may be lowered. Therefore, it may be desirable to provide a way of increasing electric machine efficiency when the electric machine is operating at low torque output levels.

The inventors herein have recognized the above-mentioned issues and have developed a method for operating an electric drive system, comprising: generating a pulsed torque request that varies in frequency between a first frequency and a second frequency in response to a constant driver demand torque request; and generating a torque that on average corresponds to the constant driver demand torque request via an electric machine in response to the pulsed torque request.

By generating a pulsed torque command or signal that varies in frequency between two frequencies, it may be possible to reduce losses of an electric drive system while maintaining a lower level of noise and vibration as compared to operating the electric drive system based on a pulsed torque command that does not vary between two frequencies in response to a constant driver demand torque request.

The present description may provide several advantages. In particular, the approach may provide smoother torque generation and lowered electric drive system losses. Further, the approach may reduce torque ripple and radial electromagnetic forces in the electric machine. Further still, the approach may be applied in different ways in different applications so that noise and vibration requirements of the different applications may be met.

The above advantages and other advantages, and features of the present description will be readily apparent from the following Detailed Description when taken alone or in connection with the accompanying drawings.

The summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 7-10 show plots of probability mass functions for varying frequency of a pulsed torque command;

FIG. 11 is a plot that shows how frequencies of a pulsed torque command may be adjusted between a plurality of values while torque output of an electric machine that is commanded to follow the pulsed torque command meets a driver demand torque;

DETAILED DESCRIPTION

Figure 1:
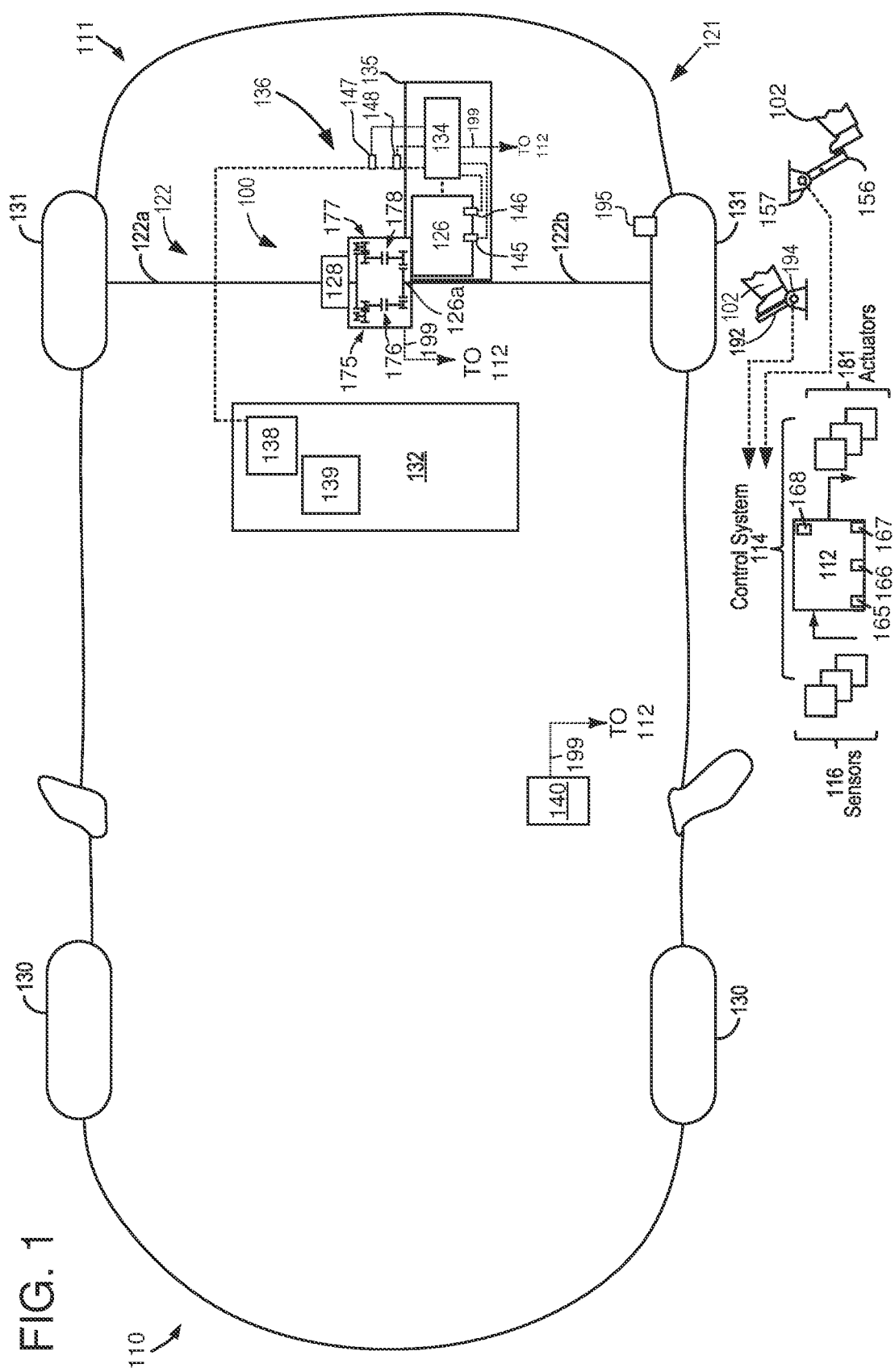
FIG. 1 is a schematic diagram of a vehicle that includes an electric machine for propulsion.
Figure 16:
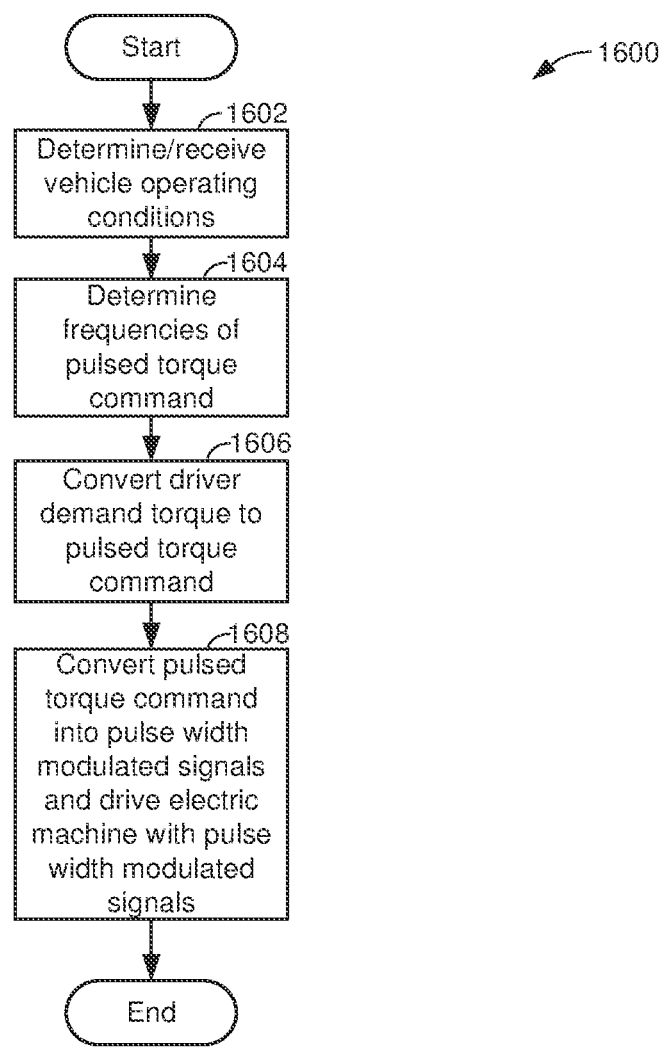
FIG. 16 shows a method for generating pulsed torque commands for operating an electric machine.
Figure 17:
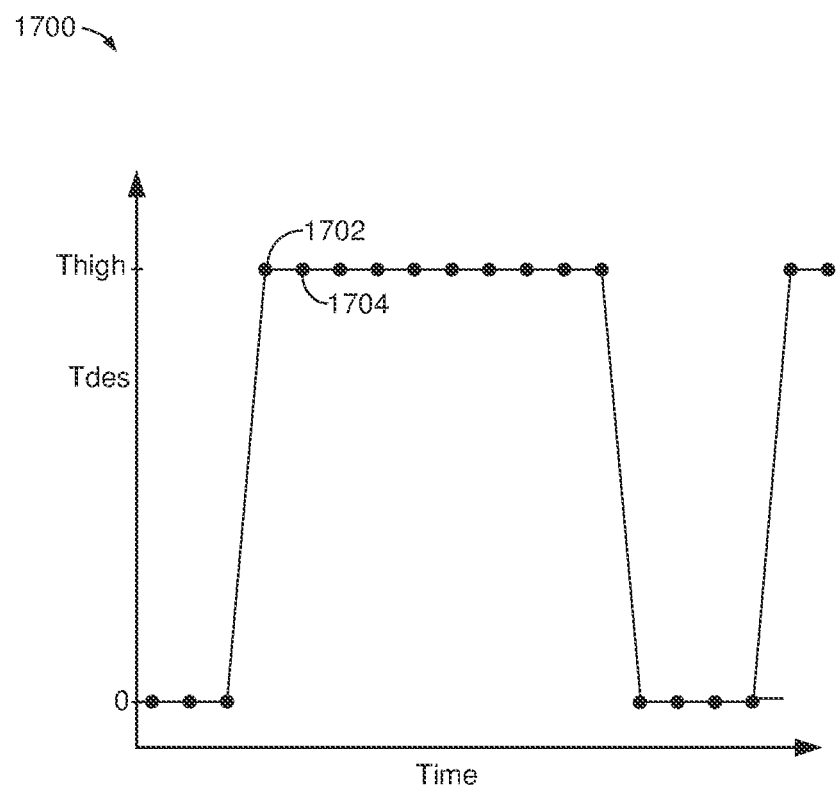
FIG. 17 is a detailed plot of a portion of a pulsed torque request.

The present description is related to improving efficiency of an electric drive system that includes an electric machine. The efficiency of the electric drive system may be improved by commanding the electric drive system via a pulsed torque command signal. The pulsed torque command signal may be output by a controller at lower driver demand torques to improve electric drive system efficiency. The pulsed torque command signal may be applied in a vehicle of the type that is shown in FIG. 1. The pulsed torque command signal may be generated via a controller and input to an electric drive system as shown in the block diagram of FIG. 2. The pulsed torque command may be applied to the electric drive system in a low torque operating region as shown in FIG. 3. FIGS. 4-15 show how frequencies of a pulsed torque command signal may be varied while meeting driver demand torque and noise and vibration metrics. FIG. 16 shows a flowchart of a method for generating a pulsed torque command signal. Finally, a detailed view of a portion of a pulsed torque request is shown in FIG. 17.

FIG. 1 is a schematic diagram of a vehicle 121 including a powertrain or vehicle propulsion system 100. A front portion of vehicle 121 is indicated at 110 and a rear portion of vehicle 121 is indicated at 111. Vehicle propulsion system 100 includes electric machine 126. Electric machine 126 may consume or generate electrical power depending on its operating mode. Throughout FIG. 1, mechanical connections between various components are illustrated as solid lines, whereas electrical connections between various components are illustrated as dashed lines.

Vehicle propulsion system 100 has a rear axle 122. In some examples, rear axle 122 may comprise two half shafts, for example first half shaft 122a, and second half shaft 122b. Vehicle propulsion system 100 further has front wheels 130 and rear wheels 131. Rear wheels 131 may be driven via electric machine 126.

The rear axle 122 is coupled to electric machine 126. Rear drive unit 136 may transfer power from electric machine 126 to axle 122 resulting in rotation of rear wheels 131. Rear drive unit 136 may include a low gear 175 and a high gear 177 that are coupled to electric machine 126 via output shaft 126a of electric machine 126. Low gear 175 may be engaged via fully closing low gear clutch 176. High gear 177 may be engaged via fully closing high gear clutch 178. High gear clutch 178 and low gear clutch 176 may be opened and closed via commands received by rear drive unit 136 over controller area network (CAN) 199. Alternatively, high gear clutch 178 and low gear clutch 176 may be opened and closed via digital outputs or pulse widths provided via control system 114. Rear drive unit 136 may include differential 128 so that torque may be provided to first half shaft 122a and to second half shaft 122b. In some examples, an electrically controlled differential clutch (not shown) may be included in rear drive unit 136.

Electric machine 126 may receive electrical power from onboard electrical energy storage device 132. Furthermore, electric machine 126 may provide a generator function to convert the vehicle's kinetic energy into electrical energy, where the electrical energy may be stored at electric energy storage device 132 for later use by electric machine 126. An inverter system controller (ISC1) 134 may convert alternating current generated by electric machine 126 to direct current for storage at the electric energy storage device 132 and vice versa. Electric drive system 135 includes electric machine 126 and inverter system controller 134. Inverter system controller may include a microcontroller, memory (e.g., random-access memory and read-only memory), and input/output circuitry (not shown). Electric energy storage device 132 may be a battery, capacitor, inductor, or other electric energy storage device. Electric power flowing into electric drive system 135 may be monitored via current sensor 145 and voltage sensor 146. Position and speed of electric machine 126 may be monitored via position sensor 147. Torque generated by electric machine 126 may be monitored via torque sensor 148.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 114 may communicate with electric machine 126, energy storage device 132, inverter system controller 134, etc. Control system 114 may receive sensory feedback information from electric drive system 135 and energy storage device 132, etc. Further, control system 114 may send control signals to electric drive system 135 and energy storage device 132, etc., responsive to this sensory feedback. Control system 114 may receive an indication of an operator requested output of the vehicle propulsion system from a human operator 102, or an autonomous controller. For example, control system 114 may receive sensory feedback from driver demand pedal position sensor 194 which communicates with driver demand pedal 192. Pedal 192 may refer schematically to a driver demand pedal. Similarly, control system 114 may receive an indication of an operator requested vehicle braking via a human operator 102, or an autonomous controller. For example, control system 114 may receive sensory feedback from brake pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to electric energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 112). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 112 may comprise a portion of a control system 114. In some examples, controller 112 may be a single controller of the vehicle. Control system 114 is shown receiving information from a plurality of sensors 116 (various examples of which are described herein) and sending control signals to a plurality of actuators 181 (various examples of which are described herein). As one example, sensors 116 may include tire pressure sensor(s) (not shown), wheel speed sensor(s) 195, etc. In some examples, sensors associated with electric machine 126, wheel speed sensor 195, etc., may communicate information to controller 112, regarding various states of electric machine operation. Controller 112 includes non-transitory (e.g., read only memory) 165, random access memory 166, digital inputs/outputs 168, and a microcontroller 167. Controller 112 may receive input data and provide data to human/machine interface 140 via CAN 199. Controller 112 may be a controller that is additional to inverter system controller 134, or alternatively, it may be a controller that is part of inverter system controller 134.

Thus, the system of FIG. 1 provides for a system, comprising: an electric drive system including an inverter and an electric machine; and a controller including executable instructions stored in non-transitory memory that cause the controller to generate a pulsed torque request that varies between a predetermined actual total number of frequencies as a function of time in response to a constant driver demand torque request. In a first example, the system includes where the predetermined actual total number of frequencies are equally distributed in frequency. In a second example that may include the first example, the system includes where a pulsed torque request has equal probability of being at each of the predetermined actual total number of frequencies. In a third example that may include one or both of the first and second examples, the system includes where the predetermined actual total number of frequencies are unequally distributed in frequency. In a fourth example that may include one or more of the first through third examples, the system includes where the pulsed torque request has unequal probability of being at each of the predetermined actual total number of frequencies. In a fifth example that may include one or more of the first through fourth examples, the system includes where the electric drive system responds to the pulsed torque request. In a sixth example that may include one or more of the first through fifth examples, the system includes where the inverter includes pulse width modulation circuitry that responds to the pulsed torque request.

Figure 2:
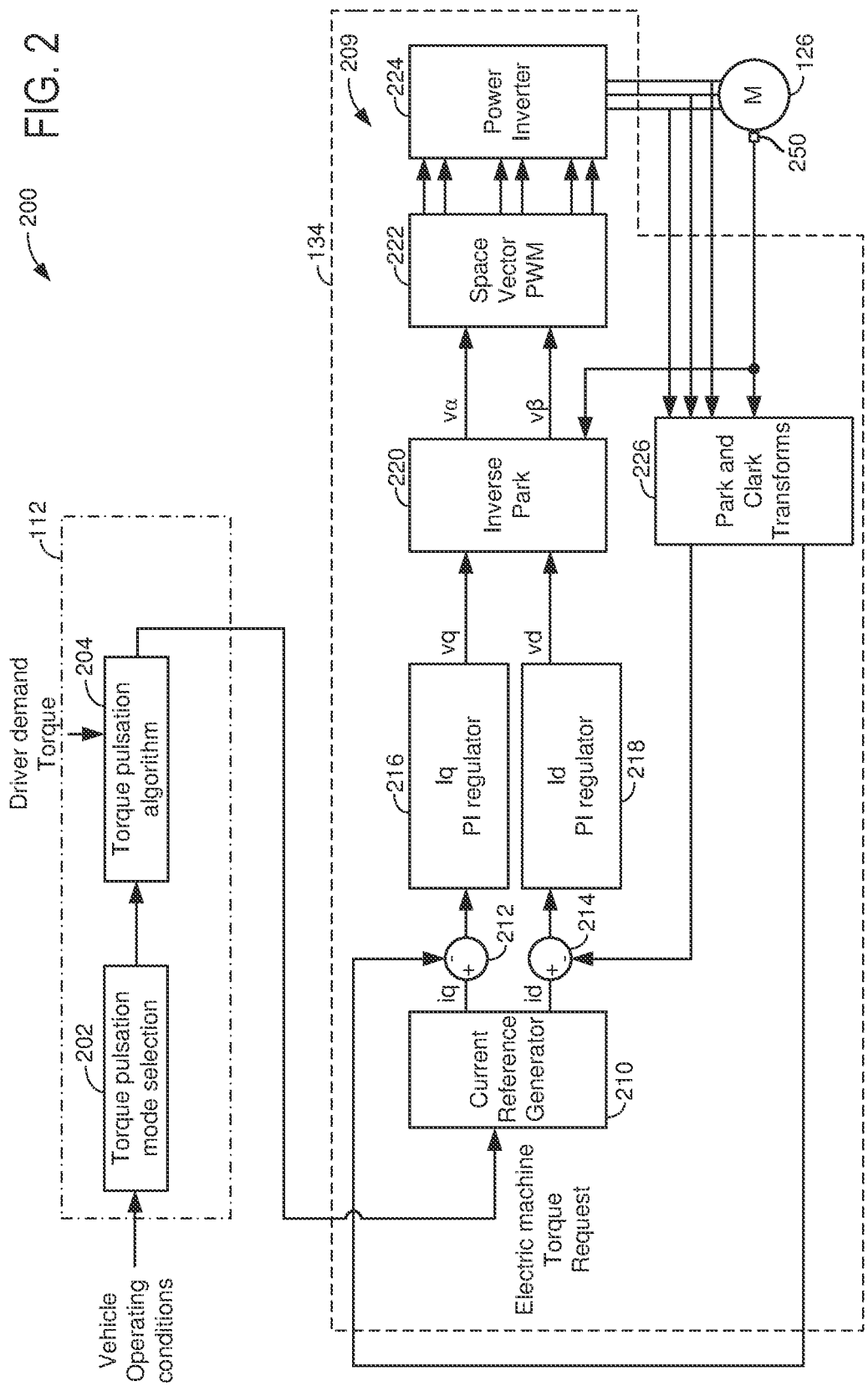
FIG. 2 is a block diagram of a controller that supplies a pulsed torque signal to an electric drive system that includes an electric machine.
Figure 3:
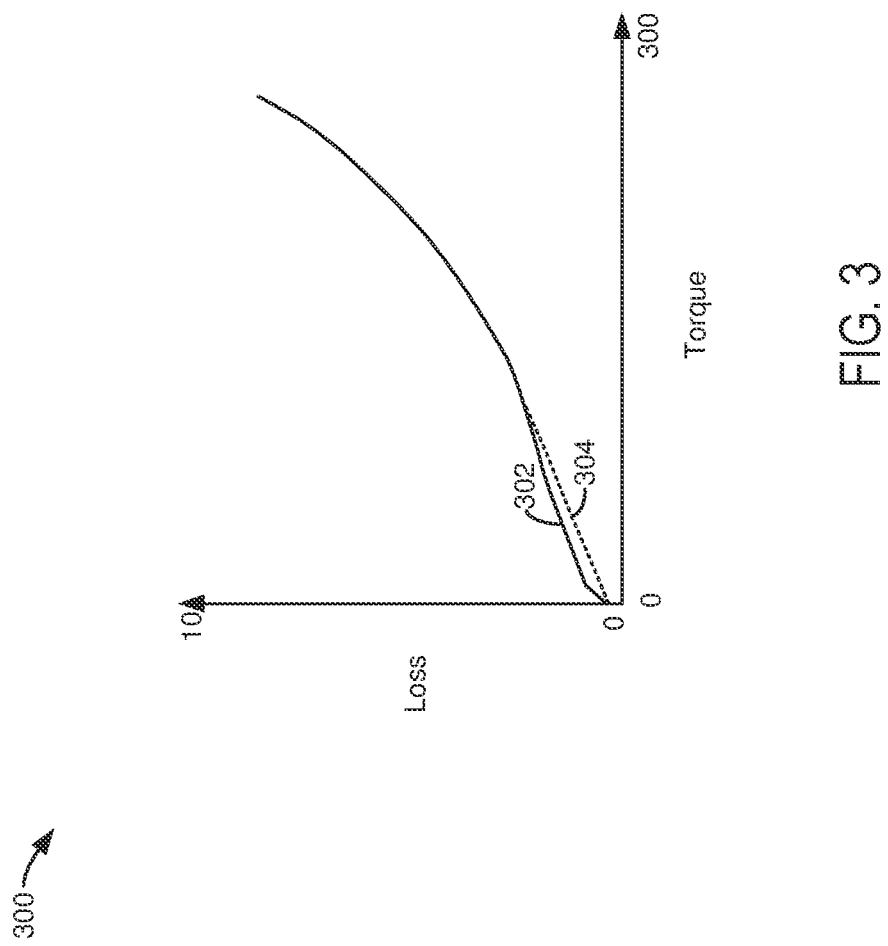
FIG. 3 is a plot that shows an electric machine operating region where losses of an electric machine may be lowered.

Referring now to FIG. 2, a block diagram 200 of a controller 112 that supplies a pulsed torque signal to an electric drive system that includes an electric machine is shown. The controller 112 includes a torque pulsation mode selection module 202 and a torque pulsation algorithm module 204. The torque pulsation mode selection module 202 and the torque pulsation module 202 may be comprised of executable instructions stored in non-transitory memory of controller 112. The torque pulsation mode selection module 202 contains the mapping between vehicle operating point (e.g., vehicle speed and driver demand torque) and the desired torque pulsation frequency. In one example, vehicle speed and driver demand torque are inputs to a table or function of empirically determined frequency values and the table or function outputs frequencies. The optimality of the torque pulsation frequency may be expected to vary as a function of vehicle operating point. This mapping allows for adjustment of torque pulsation frequency as a function of vehicle operating point to ensure a balance of efficiency improvements and NVH performance across a wide variety of vehicle operating points.

The torque pulsation algorithm module 204 modifies the driver demand torque request into a pulsed torque request or command. The pulsed torque request frequency is a function of electric machine speed. In one example, the pulsed torque request is generated via selecting a lower bound torque (e.g., zero), an upper bound torque (e.g., 100 Newton-meters), the frequency (e.g., which may be a function of electric machine speed), and the driver demand torque. A torque pulse period is determined via T=1/period, where T is the period in seconds. The percentage of the period when the torque pulse is equal to the upper bound torque may be determined via the following equation: time_high=T*(driver demand torque/upper bound torque). This equation may be modified slightly if the lower boundary torque is other than zero. The pulsed torque may then be generated by outputting a pulsed torque value that switches from the lower boundary torque value to the upper boundary torque value and back to the lower boundary torque value during a time of a period T. The pulsed torque value is equal to the upper boundary torque value for an amount of time time_high. The pulsed torque is equal to the lower boundary torque value for a time T-time_high. The pulsed torque request (e.g., a pulsed torque signal that moves between two different values without moving to intermediate values between the two values as shown in FIG. 17) may be output to a space vector pulse width modulation motor controller 209 that operates electric machine 126. Space vector pulse width modulator motor controller 209 may be included in inverter system controller 134 or controller 112.

The pulsed torque request (e.g., a signal that moves between two different values without moving to intermediate values between the two values as shown in FIGS. 5, 6, 12, and 13, and where the first of the two values is within a threshold of zero (e.g., less than five percent of maximum torque of the electric machine) and where the second value is greater than a driver demand torque that the pulsed torque request is based on) may be output to a space vector pulse width modulation motor controller 209 that operates electric machine 126. Space vector pulse width modulator motor controller 209 may be included in inverter system controller 134 or controller 112.

In this example, electric machine 126 is a three phase electric machine that is supplied with electric power via power inverter 224. The amounts of electric current that are supplied in each of the three phases is input to block 226 where Park and Clark transforms convert the electric currents from each of the three phases into a measured torque current $i_q$ and a measured flux current $i_d$. The measured flux current $i_d$ is subtracted from the commanded flux current $i_d$ at junction 214 (e.g., summing junction). The measured torque current $i_q$ is subtracted from the commanded torque current $i_q$ at junction 212 (e.g., summing junction). A pulsed torque request signal is input to current reference generator 210 and current reference generator 210 decomposes the pulsed torque request and outputs a commanded flux current $i_d$ and a commanded torque current $i_q$ to generate the commands that cause electric machine 126 to generate the average of the pulsed torque request, which is equivalent to the driver demand requested torque. Note that the driver demand requested torque may correspond to a torque output of the electric machine, a wheel torque, or an intermediate torque between electric machine torque and wheel torque. If the driver demand torque corresponds to a torque other that output torque of the electric machine, the commanded output torque for the electric machine may be compensated or adjusted for any gear ratio that may exist between the electric machine and the location in the vehicle propulsion system that corresponds to the driver demand torque.

A torque current proportional/integral controller 216 receives a torque current error from junction 212 and outputs a torque voltage $v_q$ command. Similarly, a flux current proportional/integral controller 218 receives a flux current error from junction 214 and outputs a flux voltage $v_d$ command. The torque voltage $v_q$ command and the flux voltage command $v_d$ are processed via an inverse Park transform at block 220 into a torque voltage in a rotating reference frame $v_\alpha$ and a flux voltage in the rotating reference frame $v_\beta$. At block 222, the torque voltage in the rotating reference frame $v_\alpha$ and the flux voltage in the rotating reference frame $v_\beta$ are converted into phase pulses via space vector pulse width modulation. The pulses operate the transistors or switches in the power inverter 224. The power inverter 224 outputs voltages for each of the phase windings of electric machine 126. The position of electric machine 126 is converted into an angle and the angle is supplied to blocks 220 and 226 for the inverse Park transform and the Park and Clark transforms.

Thus, a pulsed torque request is converted into two electric current commands and the two electric current commands are converted into pulse width modulated pulses. The pulse width modulated pulses control the voltage that is supplied to electric machine 126.

Turning now to FIG. 3, a plot 300 of electric machine losses verses electric machine torque is shown. Plot 300 includes a vertical axis that represents losses of the electric machine and the amount of losses increases in the direction of the vertical axis arrow. The greater the loss value, the lower the electric machine efficiency. The horizontal axis represents torque output of the electric machine and torque output increases in the direction of the horizontal axis arrow. Solid line curve 302 represents losses of an electric machine when a torque request for the electric machine is not pulsed. Dashed line 304 represents losses of the same electric machine when the torque request for the electric machine is pulsed. It may be observed that the torque losses for the electric machine are lower when the torque request is pulsed. Accordingly, there may be benefits to providing a pulsed torque request to an electric drive system.

Figure 4:
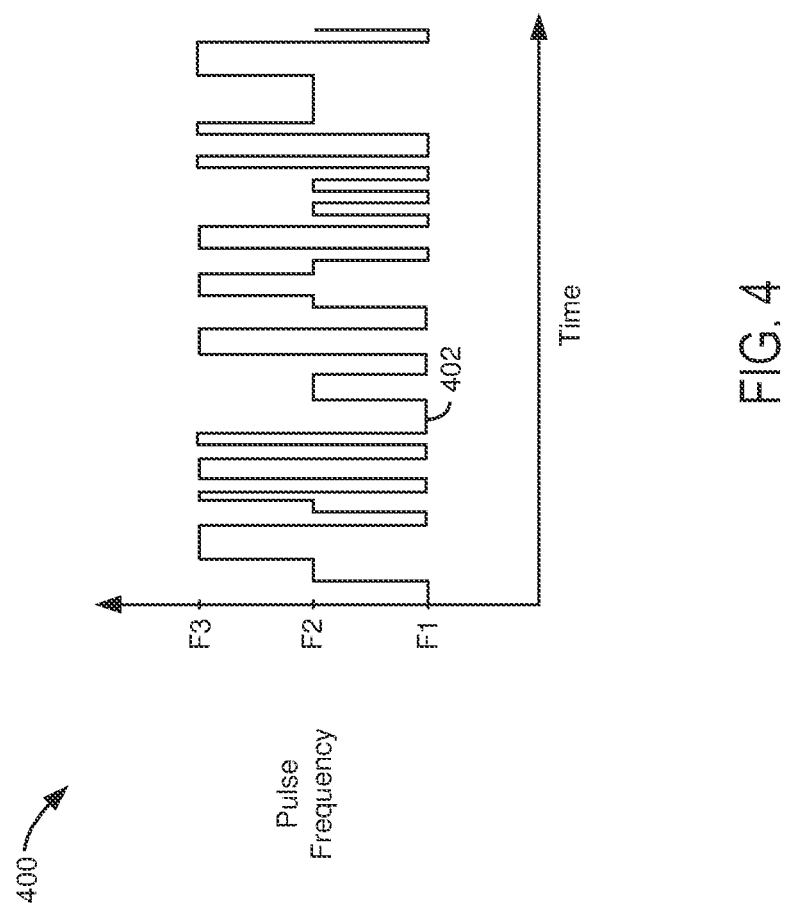
FIG. 4 is a plot that shows how frequencies of a pulsed torque command may be adjusted as a function of time while torque output of an electric machine that is commanded to follow the pulsed torque command meets a driver demand torque.

Moving on to FIG. 4, a plot of how frequency of a pulsed torque request may be adjusted while an electric machine is operated based on the frequency adjusted pulsed torque request. Plot 400 includes a vertical axis that represents frequency of a pulsed torque request and the frequency of the pulsed torque request increases in the direction of the vertical axis arrow. The horizontal axis represents time and time increases in the direction of the horizontal axis arrow. Solid line trace 402 represents the frequency of a pulsed torque request. In this example, the actual total number of frequencies that may be applied to generate the pulsed torque request is restricted to three. Thus, an actual total number of three frequencies (e.g., no more than and no less than three frequencies) may be a basis for generating a pulsed torque request. In this example, the three frequencies are F1, F2, and F3. Note that although trace 402 extends between the frequencies F1, F2, and F3, intervening frequencies are not the basis for generating the pulsed torque request. Trace 402 extends between these three frequencies to aid in following the trace. It may also be appreciated that the actual total number of frequencies applied to generate the pulsed torque request need not be restricted to three.

Figure 5:
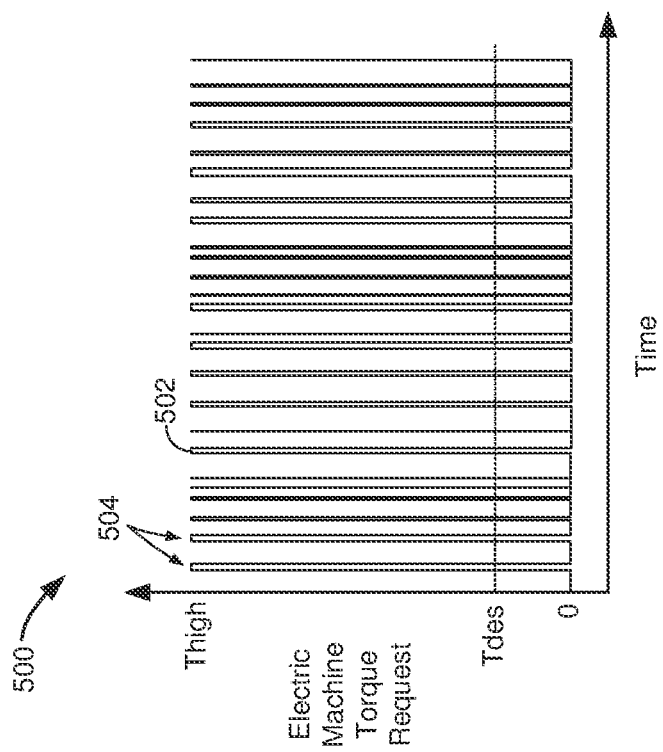

Referring now to FIG. 5, a plot 500 of a first example of a pulsed torque request that is generated to lower losses of an electric drive system is shown. The vertical axis that represents the pulsed torque request torque value and the pulsed torque request torque value increases in the direction of the vertical axis arrow. The horizontal axis represents time and time increases in the direction of the horizontal axis arrow. Solid line 502 represents the pulsed torque request. Note that although solid line 502 extends between the torque values 0 and Thigh, intervening torque values are not included as values in the pulsed torque request. The pulsed torque request that is represented by solid line 502 contains only values of zero and Thigh. Solid line 502 extends between these torque values to aid in following the trace. An example of values used to generate a pulsed torque trace is shown in FIG. 17.

Solid line 502 moves between solely two values, namely, zero and Thigh. The value of Thigh may be adjusted along with the frequency that pulses (e.g., 504) are generated to adjust the average torque (Tdes) that will be generated by the electric machine 126 when the electric machine is commanded to follow the pulsed torque solid line 502. The average torque (Tdes) is equivalent to the driver demand torque, or the driver demand torque that is adjusted based on the corresponding location of the driver demand torque. For example, if the driver demand torque is a wheel torque, the average torque (Tdes) is equivalent to the driver demand torque adjusted for gear ratios between the electric machine and the wheel.

Notice that the timing at which pulses are output (e.g., the torque command changes from zero to Thigh) varies in time and that the duration of the pulse widths (e.g., the time that the torque command is at the value Thigh) changes with time. These changes correspond to the changing the frequency of the torque request as a function of time. Thus, a lower driver demand torque may be produced via generating a pulsed torque request that switches between two values to generate a series of short duration torque pulse requests.

Figure 6:
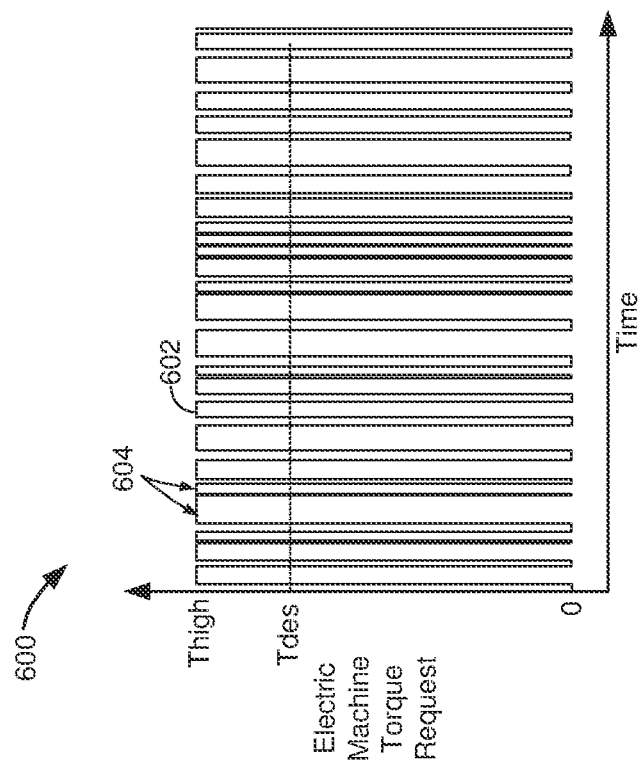
FIGS. 5 and 6 show plots of pulsed torque commands that are varied as a function of time to meet a constant driver demand torque.

Referring now to FIG. 6, a plot 600 of a second example of a pulsed torque request that is generated to lower losses of an electric drive system is shown. The vertical axis that represents the pulsed torque request torque value and the pulsed torque request torque value increases in the direction of the vertical axis arrow. The horizontal axis represents time and time increases in the direction of the horizontal axis arrow. Solid line 602 represents the pulsed torque request. Note that although solid line 602 extends between the torque values 0 and Thigh, intervening torque values are not included as values in the pulsed torque request. The pulsed torque request that is represented by solid line 602 contains only values of zero and Thigh. Solid line 602 extends between these torque values to aid in following the trace.

Solid line 602 moves between solely two values, namely, zero and Thigh. The value of Thigh may be adjusted along with the frequency that pulses (e.g., 604) are generated to adjust the average torque (Tdes) that will be generated by the electric machine 126 when the electric machine is commanded to follow the pulsed torque solid line 602. The average torque (Tdes) is equivalent to the driver demand torque, or the driver demand torque that is adjusted based on the corresponding location of the driver demand torque.

Notice that the timing at which pulses are output (e.g., the torque command changes from zero to Thigh) varies in time and that the duration of the pulse widths (e.g., the time that the torque command is at the value Thigh) changes with time. These changes correspond to the changing the frequency of the torque request as a function of time. Thus, a higher driver demand torque may be produced via generating a pulsed torque request that switches between two values to generate a series of longer duration torque pulse requests.

Referring now to FIGS. 7-10, non-limiting example probability mass functions for the restricted frequencies that may be a basis for generating a pulsed torque request are shown. The example probability mass functions may be a basis for controlling how often a particular frequency in the group of restricted frequencies is applied to generate the pulsed torque request. It may be desirable to apply different probability mass functions because particular frequencies may be better or worse for lowering electric drive system losses.

FIG. 7 shows a first example probability mass function. The vertical axis represents a relative probability that a particular frequency is applied to generate the pulsed torque request. The relative probability increases in the direction of the vertical axis arrow. The horizontal axis represents frequencies to generate the pulsed torque request. The frequency increases in the direction of the horizontal axis arrow.

In this example, the frequencies are restricted to three values (F1, F2, and F3) and the frequency interval between the three frequencies is evenly distributed. Thus, the probability mass distribution shows three equally distributed frequencies with equal probability.

FIG. 8 shows a second example probability mass function. The vertical axis represents a relative probability that a particular frequency is applied to generate the pulsed torque request. The relative probability increases in the direction of the vertical axis arrow. The horizontal axis represents frequencies to generate the pulsed torque request. The frequency increases in the direction of the horizontal axis arrow.

In this example, the frequencies are restricted to three values (F1, F2, and F3) and the frequency interval between the three frequencies is unevenly distributed. Thus, the probability mass distribution shows three unequally distributed frequencies with equal probability.

FIG. 9 shows a third example probability mass function. The vertical axis represents a relative probability that a particular frequency is applied to generate the pulsed torque request. The relative probability increases in the direction of the vertical axis arrow. The horizontal axis represents frequencies to generate the pulsed torque request. The frequency increases in the direction of the horizontal axis arrow.

In this example, the frequencies are restricted to four values (F1, F2, F3, and F4) and the frequency interval between the four frequencies is evenly distributed. Thus, the probability mass distribution shows four equally distributed frequencies with equal probability.

FIG. 10 shows a fourth example probability mass function. The vertical axis represents a relative probability that a particular frequency is applied to generate the pulsed torque request. The relative probability increases in the direction of the vertical axis arrow. The horizontal axis represents frequencies to generate the pulsed torque request. The frequency increases in the direction of the horizontal axis arrow.

In this example, the frequencies are restricted to three values (F1, F2, and F3) and the frequency interval between the three frequencies is evenly distributed. However, in this example, the probability of selecting F3 is lowered and the probability of selecting F2 is increased. Thus, the probability mass distribution shows three unequally distributed frequencies with unequal probability.

Referring now to FIG. 11, a plot of how frequency of a pulsed torque request may be adjusted while an electric machine is operated based on the frequency adjusted pulsed torque request. Plot 1100 includes a vertical axis that represents frequency of a pulsed torque request and the frequency of the pulsed torque request increases in the direction of the vertical axis arrow. The horizontal axis represents time and time increases in the direction of the horizontal axis arrow. Solid line trace 1102 represents the frequency of a pulsed torque request. In this example, the actual total number of frequencies that may be applied to generate the pulsed torque request is not restricted. Thus, virtually any actual total number of frequencies may be applied to determine the pulsed torque request. Note that although trace 1102 extends between many frequencies, intervening frequencies (e.g., where trace 1102 extends vertically) are not the basis for generating the pulsed torque request. Trace 1102 extends between individual frequencies to aid in following the trace.

Figure 12:
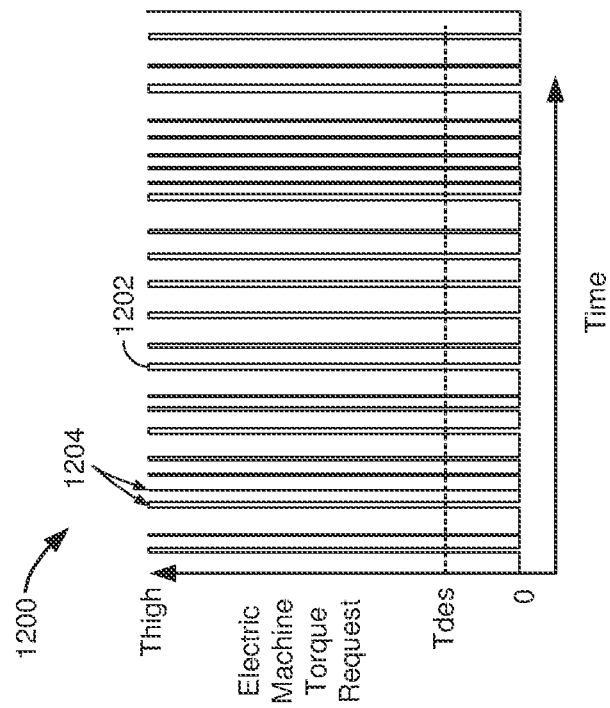
FIGS. 12 and 13 show plots of pulsed torque commands that are varied to a plurality of frequencies as a function of time to meet a constant driver demand torque.

Referring now to FIG. 12, a plot 1200 of a first example of a pulsed torque request that is generated to lower losses of an electric drive system with unrestricted frequency adjustments is shown. The vertical axis that represents the pulsed torque request torque value and the pulsed torque request torque value increases in the direction of the vertical axis arrow. The horizontal axis represents time and time increases in the direction of the horizontal axis arrow. Solid line 1202 represents the pulsed torque request. Note that although solid line 1202 extends between the torque values 0 and Thigh, intervening torque values are not included as values in the pulsed torque request. The pulsed torque request that is represented by solid line 1202 contains only values of zero and Thigh. Solid line 1202 extends between these torque values to aid in following the trace.

Solid line 1202 moves between solely two values, namely, zero and Thigh. The value of Thigh may be adjusted along with the frequency that pulses (e.g., 1204) are generated to adjust the average torque (Tdes) that will be generated by the electric machine 126 when the electric machine is commanded to follow the pulsed torque solid line 1202. The average torque (Tdes) is equivalent to the driver demand torque, or the driver demand torque that is adjusted based on the corresponding location of the driver demand torque. For example, if the driver demand torque is a wheel torque, the average torque (Tdes) is equivalent to the driver demand torque adjusted for gear ratios between the electric machine and the wheel.

Notice that the timing at which pulses are output (e.g., the torque command changes from zero to Thigh) varies in time and that the duration of the pulse widths (e.g., the time that the torque command is at the value Thigh) changes with time. These changes correspond to the changing the frequency of the torque request as a function of time. Thus, a lower driver demand torque may be produced via generating a pulsed torque request that switches between two values to generate a series of short duration torque pulse requests.

Figure 13:
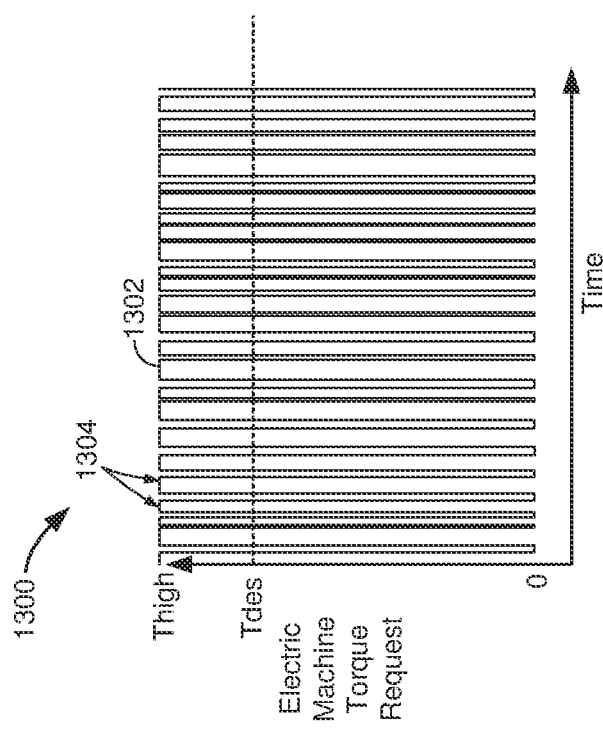

Referring now to FIG. 13, a plot 1300 of a second example of a pulsed torque request that is generated to lower losses of an electric drive system with unrestricted frequency adjustments is shown. The vertical axis that represents the pulsed torque request torque value and the pulsed torque request torque value increases in the direction of the vertical axis arrow. The horizontal axis represents time and time increases in the direction of the horizontal axis arrow. Solid line 1302 represents the pulsed torque request. Note that although solid line 1302 extends between the torque values 0 and Thigh, intervening torque values are not included as values in the pulsed torque request. The pulsed torque request that is represented by solid line 1302 contains only values of zero and Thigh. Solid line 1302 extends between these torque values to aid in following the trace.

Solid line 1302 moves between solely two values, namely, zero and Thigh. The value of Thigh may be adjusted along with the frequency that pulses (e.g., 1304) are generated to adjust the average torque (Tdes) that will be generated by the electric machine 126 when the electric machine is commanded to follow the pulsed torque solid line 1302. The average torque (Tdes) is equivalent to the driver demand torque, or the driver demand torque that is adjusted based on the corresponding location of the driver demand torque.

Notice that the timing at which pulses are output (e.g., the torque command changes from zero to Thigh) varies in time and that the duration of the pulse widths (e.g., the time that the torque command is at the value Thigh) changes with time. These changes correspond to the changing the frequency of the torque request as a function of time. Thus, a higher driver demand torque may be produced via generating a pulsed torque request that switches between two values to generate a series of longer duration torque pulse requests.

Figures 14, 15:
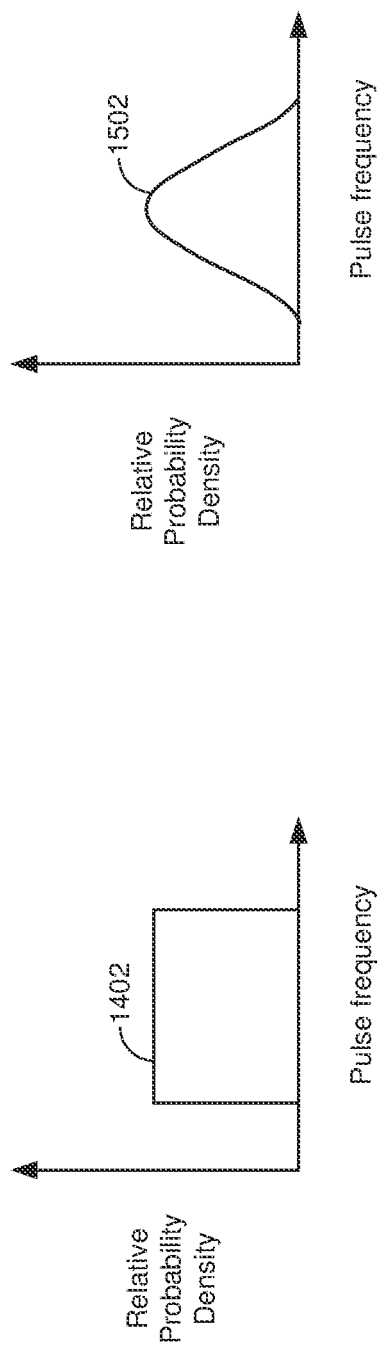
FIGS. 14 and 15 show example probability distribution functions for varying frequencies of a pulsed torque command.

Referring now to FIGS. 14 and 15, non-limiting example probability distribution functions for the restricted frequencies that may be a basis for generating a pulsed torque request are shown. The example probability distribution functions may be a basis for controlling how often a particular frequency in the group of restricted frequencies is applied to generate the pulsed torque request. It may be desirable to apply different probability distribution functions because particular frequencies may be better or worse for lowering electric drive system losses.

FIG. 14 shows a first example probability distribution function. The vertical axis represents a relative probability density that a particular frequency is applied to generate the pulsed torque request. The relative probability density increases in the direction of the vertical axis arrow. The horizontal axis represents frequencies to generate the pulsed torque request. The pulse frequency increases in the direction of the horizontal axis arrow.

In this example, the pulse frequencies are not restricted and the probability distribution is of a uniform type. Trace 1402 illustrates a type of probability distribution (uniform) that is applied to generate the pulsed torque request may be based on vehicle operating conditions (e.g., vehicle speed and driver demand torque) and probability distribution types may be retrieved from a look-up table that is referenced via the vehicle operating conditions.

FIG. 15 shows a second example probability distribution function. The vertical axis represents a relative probability density that a particular frequency is applied to generate the pulsed torque request. The relative probability density increases in the direction of the vertical axis arrow. The horizontal axis represents frequencies to generate the pulsed torque request. The pulse frequency increases in the direction of the horizontal axis arrow.

In this example, the pulse frequencies are not restricted and the probability distribution is of a normal type. Trace 1502 illustrates a type of probability distribution (normal) that is applied to generate the pulsed torque request may be based on vehicle operating conditions (e.g., vehicle speed and driver demand torque) and probability distribution types may be retrieved from a look-up table that is referenced via the vehicle operating conditions.

Referring to FIG. 16, a flowchart of a method for generating a pulsed torque command for an electric machine is shown. The method of FIG. 16 may be at least partially implemented as executable instructions stored in controller memory in the systems of FIG. 1. Further, the method of FIG. 16 may include actions taken in the physical world to transform operating states of the system of FIG. 1. In addition, in some examples, the method of FIG. 16 may be distributed amongst several controllers where each controller performs a portion of the method. Method 1600 may execute when a vehicle is operating within a predetermined speed and driver demand torque range.

At 1602, method 1600 receives vehicle operating conditions. Vehicle operating conditions may include, but are not limited to vehicle speed and driver demand torque. Driver demand torque may be determined from a position of a driver demand pedal and vehicle speed. Method 1600 proceeds to 1604.

At 1604, method 1600 determines frequencies that are a basis for generating the pulsed torque request or command. In one example, method 1600 references a table or function according to vehicle operating conditions and the table or function outputs frequencies. The frequencies may be empirically determined by operating an electric machine and adjusting pulsed torque commands to achieve a desired level of electric drive system losses. The frequencies may be bounded or constrained to a range of frequencies via an upper frequency bound and a lower frequency bound. Method 1600 proceeds to 1606.

At 1606, method 1600 converts the driver demand torque request into a pulsed torque request or command. The pulsed torque request is a function of time. In one example, the pulsed torque request is generated via a function that has inputs including driver demand torque request and requested pulsation frequency as output from block 202 of FIG. 2. The pulsed torque request may be generated as previously discussed. Method 1600 proceeds to 1608.

At 1608, method 1600 processes the pulsed torque request into pulse width modulated signals and drives an electric machine via the pulse width modulated signals. The electric machine generates an average torque that is substantially equal to the driver demand torque or the driver demand torque modified according to a location in a driveline where the driver demand torque is requested (e.g., a wheel torque). Method 1600 proceeds to exit.

In this way, method 1600 converts a driver demand request into a pulsed torque request and commands an electric machine to follow the pulsed torque requested. The pulsed torque request may be generated based on one or more frequencies. The frequencies may cause noise and vibrations from an electric drive system to be lowered.

The method of FIG. 16 provides for a method for operating an electric drive system, comprising: generating a pulsed torque request that varies in frequency between a first frequency and a second frequency in response to a constant driver demand torque request; and generating a torque that on average corresponds to the constant driver demand torque request via an electric machine in response to the pulsed torque request. In a first example, the method includes where the pulsed torque request is comprised of a plurality of torque request values that are only either a first value or a second value. In a second example that may include the first example, the method includes where the pulsed torque request that varies in frequency as a function of time follows a uniform distribution of frequency values. In a third example that may include one or both of the first and second examples, the method includes where the pulsed torque request that varies in frequency as a function of time follows a uniform distribution of frequency values. In a fourth example that may include one or more of the first through third examples, the method includes where the pulsed torque request varies in frequency as a function of time. In a fifth example that may include one or more of the first through fourth examples, the method includes where the driver demand torque is based on a position of a driver demand pedal. In a sixth example that may include one or more of the first through fifth methods, the method further comprises converting the pulsed torque request that varies in frequency to a pulse width modulated signal to command a power inverter. In a seventh example that may include one or more of the first through sixth examples, the method includes where the power inverter drives the electric machine.

The method of FIG. 16 also provides for a method for operating an electric drive system, comprising: generating a pulsed torque request that varies in frequency between a plurality of frequencies that are bounded by a first frequency and a second frequency in response to a driver demand torque request; and generating a torque that on average corresponds to the constant driver demand torque via an electric machine in response to the pulsed torque request. In a first example, the method includes where the electric machine is coupled to a wheel. In a second example that may include the first example, the method includes where the driver demand torque request is constant. In a third example that may include one or both of the first and second examples, the method further comprises adjusting the driver demand torque in response to a driver demand pedal position. In a fourth example that may include one or more of the first through third examples, the method includes where the plurality of frequencies are a function of vehicle speed and driver demand torque.

Referring now to FIG. 17, shows how an example pulsed torque request may be generated. Plot 1700 includes a vertical axis and a horizontal axis. The vertical axis represents a torque request value (e.g., 0-600 Newton-meters) and the torque request value increases in the direction of the vertical axis arrow. The horizontal axis represents time and time increases from the left side of the figure to the right side of the figure.

In this example, the pulsed torque request is either one of two values. Namely, the pulsed torque request value is zero or Thigh. The average pulsed torque is equal to Tdes, which is equal to a constant driver demand torque that is being requested. The pulsed torque request is comprised of individual values that are indicated via dots that are similar to dot 1702. The line that links the dots as mentioned with regard to traces 502 and 602 in FIGS. 5 and 6 is provided to visually improve the plot, not to indicate that there are any intermediate torque values between 0 and Thigh because there are none. These individual values may be updated at a predetermined rate via the controller to permit generation of a pulse torque request at a desired frequency.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an electric drive system, comprising:
generating a pulsed torque request that varies in frequency as a function of time between a first frequency and a second frequency in response to a constant driver demand torque request, wherein the pulsed torque request follows a uniform distribution of frequency values; and
generating a torque that on average corresponds to the constant driver demand torque request via an electric machine in response to the pulsed torque request.

2. The method of claim 1, where the pulsed torque request is comprised of a plurality of torque request values that are only either a first value or a second value.

3. The method of claim 1, where the pulsed torque request is an output of a torque pulsation algorithm module that modifies the constant driver demand torque request.

4. The method of claim 1, where the pulsed torque request varies in frequency as a function of time.

5. The method of claim 1, where the constant driver demand torque request is based on a position of a driver demand pedal.

6. The method of claim 1, further comprising converting the pulsed torque request that varies in frequency to a pulse width modulated signal to command a power inverter.

7. The method of claim 6, where the power inverter drives the electric machine.

8. A system, comprising:
an electric drive system including an inverter and an electric machine; and
a controller including executable instructions stored in non-transitory memory that cause the controller to generate a pulsed torque request that varies between a predetermined actual total number of frequencies as a function of time in response to a constant driver demand torque request, and wherein the predetermined actual total number of frequencies are equally distributed in frequency and the pulsed torque request has equal probability of being at each of the predetermined actual total number of frequencies.

9. The system of claim 8, where the constant driver demand torque request corresponds to a torque output of the electric machine, a wheel torque, or an intermediate torque between the electric machine torque and the wheel torque.

10. The system of claim 8, where the controller comprises a torque pulsation selection module and a torque pulsation algorithm module, wherein the pulsation selection module comprises mapping between a vehicle operating point and a desired torque pulsation frequency, and wherein the torque pulsation algorithm module modifies the constant driver demand torque request into the pulsed torque request.

11. The system of claim 8, where the electric drive system responds to the pulsed torque request.

12. The system of claim 8, where the inverter includes pulse width modulation circuitry that responds to the pulsed torque request.

13. A method for operating an electric drive system, comprising:
generating a pulsed torque request that varies in frequency between a plurality of frequencies that are bounded by a first frequency and a second frequency in response to a driver demand torque request, where the first frequency and the second frequency are unequally distributed in frequency and the pulsed torque request has unequal probability of being at each of the first frequency and the second frequency; and
generating a torque that on average corresponds to the driver demand torque request via an electric machine in response to the pulsed torque request.

14. The method of claim 13, where the electric machine is coupled to a wheel.

15. The method of claim 13, where the driver demand torque request is constant.

16. The method of claim 13, further comprising adjusting the driver demand torque request in response to a driver demand pedal position.

17. The method of claim 13, where the plurality of frequencies are a function of vehicle speed and driver demand torque.

* * * * *